United States Patent
Ullrich et al.

(10) Patent No.: US 10,230,701 B2
(45) Date of Patent: Mar. 12, 2019

(54) SELECTIVE ENCRYPTION OF PROFILE FIELDS FOR MULTIPLE CONSUMERS

(71) Applicant: INTUIT INC., Mountain View, CA (US)

(72) Inventors: Tobias Ullrich, Muenster (DE); Lars Pfannenschmidt, Muenster (DE); Frank Wisniewski, Muenster (DE)

(73) Assignee: INTUIT INC., Mountain View, CA (US)

(*) Notice: Subject to any disclaimer, the term of this patent is extended or adjusted under 35 U.S.C. 154(b) by 222 days.

(21) Appl. No.: 14/928,777

(22) Filed: Oct. 30, 2015

(65) Prior Publication Data

US 2017/0126644 A1 May 4, 2017

(51) Int. Cl.
*H04L 29/06* (2006.01)
*H04L 9/32* (2006.01)

(52) U.S. Cl.
CPC .......... *H04L 63/061* (2013.01); *H04L 9/3268* (2013.01); *H04L 63/045* (2013.01); *H04L 63/0823* (2013.01)

(58) Field of Classification Search
CPC . H04L 9/3268; H04L 63/061; H04L 63/0435; H04L 63/0442; H04L 63/0823; H04L 63/045
See application file for complete search history.

(56) References Cited

U.S. PATENT DOCUMENTS

| | | | |
|---|---|---|---|
| 6,820,204 B1* | 11/2004 | Desai | G06F 21/6245 705/51 |
| 6,983,377 B1* | 1/2006 | Beesley | G06F 21/31 709/229 |
| 7,076,558 B1* | 7/2006 | Dunn | G06F 21/6218 709/225 |
| 7,359,517 B1* | 4/2008 | Rowe | G06F 21/6218 380/284 |
| 7,469,341 B2* | 12/2008 | Edgett | G06F 21/31 705/75 |
| 7,792,300 B1 | 9/2010 | Caronni | |
| 8,065,713 B1* | 11/2011 | Vainstein | H04L 63/102 713/168 |
| 8,543,649 B2* | 9/2013 | Gilmour | G06F 17/3061 707/754 |
| 9,460,421 B2* | 10/2016 | Lai | G06F 21/335 |
| 2006/0126836 A1* | 6/2006 | Rivas | H04L 9/0891 380/47 |

(Continued)

OTHER PUBLICATIONS

International Search Report and Written Opinion dated Jul. 26, 2016 for Application No. PCT/US2015/058464.

*Primary Examiner* — Joseph P Hirl
*Assistant Examiner* — Thomas A Gyorfi
(74) *Attorney, Agent, or Firm* — Patterson + Sheridan, LLP

(57) ABSTRACT

The disclosed embodiments relate to a system that provides a selective encryption technique that encrypts all of the fields in a profile, and selectively enables consumers of the profile information to decrypt specific fields in the profiles. This is accomplished by encrypting each field in the profile using a randomly generated symmetric key, and then encrypting the symmetric key for each field with public keys belonging to individuals who are authorized to access each field. These encrypted public keys are stored in a header of the profile to enable individuals to use their corresponding private keys to decrypt symmetric keys for the specific fields that they are authorized to access.

27 Claims, 10 Drawing Sheets

(56) References Cited

U.S. PATENT DOCUMENTS

| | | |
|---|---|---|
| 2007/0174362 A1 | 7/2007 | Pham et al. |
| 2008/0155267 A1* | 6/2008 | Lieber ............... H04L 63/061 |
| | | 713/183 |
| 2008/0155664 A1* | 6/2008 | Lieber ............... H04L 63/061 |
| | | 726/5 |
| 2012/0291124 A1* | 11/2012 | Maria ................. H04L 63/08 |
| | | 726/22 |
| 2013/0179677 A1 | 7/2013 | Harada et al. |
| 2014/0006346 A1 | 1/2014 | Davis et al. |
| 2015/0113279 A1 | 4/2015 | Andersen et al. |
| 2017/0099267 A1* | 4/2017 | Heit ................... H04L 63/0435 |

* cited by examiner

SELECTIVE ENCRYPTION OF PROFILE FIELDS FOR MULTIPLE CONSUMERS

RELATED APPLICATIONS

The subject matter of this application is related to the subject matter in a non-provisional application by inventors Tobias Ullrich, Lars Pfannenschmidt, Frank Wisniewski, Lucian V. Lita, Brian W. Gardner and Thorsten Kruger, entitled "Making a Copy of a Profile Store while Processing Live Updates," filed on the same day as the instant application, U.S. patent application Ser. No. 14/928,816.

BACKGROUND

Related Art

The disclosed embodiments generally relate to systems for storing profile information for people or organizations.

Websites and other online applications typically maintain profile information for their users, wherein this profile information can include various user attributes, such as email addresses, telephone numbers, Social Security numbers and credit card numbers. This profile information is typically maintained in some type of "profile store," which contains profiles for various users (and possibly organizations), wherein each profile may contain dozens or even hundreds of fields containing individual pieces of profile information.

There exist a number of challenges in managing such a profile store. First, it is extremely important to keep such profile information secure to prevent malicious individuals from obtaining sensitive information, such as credit card numbers and Social Security numbers. It can also be challenging to manage updates to this profile information because some profile stores include hundreds of millions of profiles, which can be updated by individual users, and this creates a continual stream of updates that need to be applied to the profile store.

One particular challenge in managing a profile store is to make a copy of the profile store to facilitate various operations, such as building search indices for the profile data, or performing batch-processing operations on the profile data. This copying operation is complicated by the fact that the profile store is continually being updated. This means that during the time it takes to make copies of all of the profiles in a profile store, a large number of updates can potentially take place. These continual updates make it hard to obtain a coherent snapshot of the profile store at any given point in time.

Hence, what is needed is a method and an apparatus that facilitates making a copy of a profile store without the above-described problems.

SUMMARY

As mentioned above, it is extremely important to keep the profile information secure because the profile information often includes sensitive information, such as credit card numbers, Social Security numbers and passwords, which can be used by malicious individuals for fraudulent purposes. Profiles can also contain other types of personal information, such as addresses, telephone numbers, income information, and email addresses, that users want to keep in confidence.

At the same time, it is useful to be able to perform various operations to analyze the profile information, for example to detect duplicate profiles, to obtain demographic information about profile holders, or to spot cross-marketing opportunities for specific profile holders. Unfortunately, allowing more entities access to this profile information for analysis purposes makes the profile information less secure.

To deal with this problem, the disclosed embodiments provide a selective encryption technique that encrypts all of the fields in a profile, and selectively enables consumers of the profile information to decrypt specific fields in the profiles. This is accomplished by encrypting each field in the profile using a randomly generated symmetric key, and then encrypting the symmetric key for each field with public keys belonging to individuals who are authorized to access each field. These encrypted public keys are stored in a header of the profile to enable individuals to use their corresponding private keys to decrypt symmetric keys for the specific fields that they are authorized to access.

More specifically, during operation, the system retrieves the profile, wherein the profile includes the encrypted fields that have been encrypted using symmetric keys, and a header including encrypted versions of the symmetric keys, wherein the symmetric keys have been encrypted using public keys associated with consumers. Next, the system uses a private key associated with a consumer to decrypt a subset of the symmetric keys, wherein the subset of the symmetric keys was used to encrypt a subset of the encrypted fields in the profile that the consumer is allowed to access. Finally, the system uses the subset of the symmetric keys to decrypt values in the subset of encrypted fields that the consumer is allowed to access.

In some embodiments, the system also facilitates accessing encrypted fields contained in an "update" to the profile. In doing so, the system retrieves the update, wherein the update includes the encrypted fields that have been encrypted using symmetric keys, and a header including encrypted versions of the symmetric keys that have been encrypted using public keys associated with consumers. Next, the system uses a private key associated with a given consumer to decrypt a subset of the symmetric keys, wherein the subset of the symmetric keys was used to encrypt a subset of the encrypted fields in the update that the given consumer is allowed to access. Finally, the system uses the subset of the symmetric keys to decrypt values in the subset of the encrypted fields.

In some embodiments, each encrypted field in the profile is encrypted with a different symmetric key.

In some embodiments, the header includes multiple encrypted versions of a single symmetric key, which have been encrypted using public keys associated with different consumers.

In some embodiments, the header is organized to facilitate looking up encrypted versions of symmetric keys belonging to a given consumer.

In some embodiments, the encrypted versions of symmetric keys for the consumer contained in the header are produced by: generating a symmetric key for the consumer; using the symmetric key for the consumer to encrypt symmetric keys for fields the consumer is allowed to access; using a public key for the consumer to encrypt the symmetric key for the consumer; and storing the encrypted symmetric keys for the fields the consumer is allowed to access and the encrypted symmetric key for the consumer in the header. In these embodiments, using the private key associated with the consumer to decrypt the subset of symmetric keys for the fields the consumer is allowed to access involves: using the private key for the consumer to decrypt the encrypted symmetric key for the consumer; and using the decrypted symmetric key for the consumer to decrypt the subset of symmetric keys for the fields the consumer is allowed to access.

In some embodiments, the system revokes access by the given consumer to one or more fields in the profile by updating the header of the profile to remove encrypted versions of symmetric keys that can be decrypted using a private key associated with the given consumer.

In some embodiments, prior to accessing the profile, the system encrypts the profile by first encrypting each field in the profile using an associated symmetric key in a set of symmetric keys. Next, the system uses public keys associated with a set of consumers to encrypt the set of symmetric keys to produce a set of encrypted symmetric keys, and finally stores the set of encrypted symmetric keys in the header for the profile.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

System for Copying a Profile Store

Figure 1:
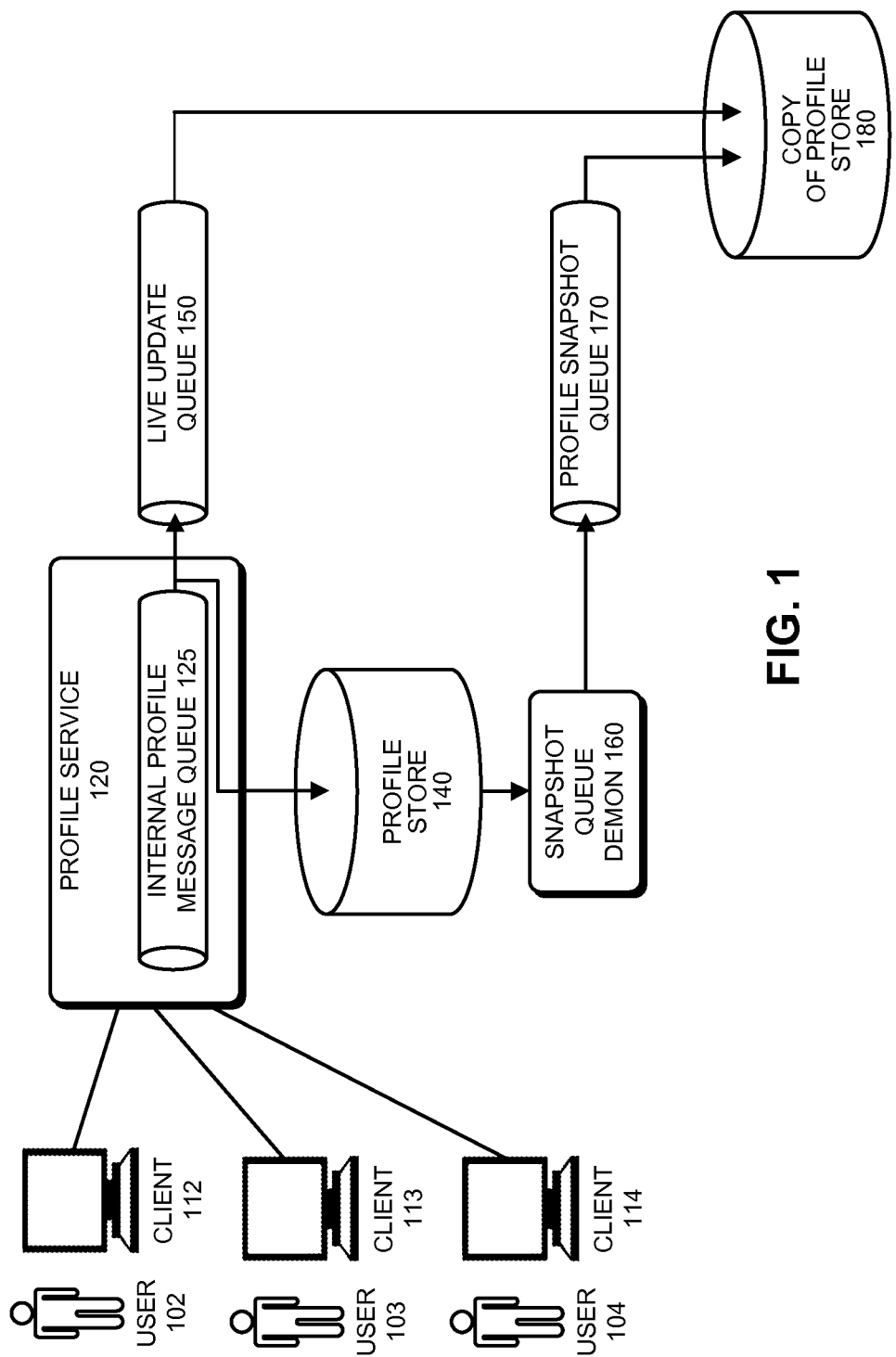
FIG. 1 illustrates a system for copying a profile store in accordance with disclosed embodiments.

FIG. 1 illustrates a system that facilitates making a copy of a profile store in accordance with disclosed embodiments. The system centers around a profile service 120, which performs various operations on behalf of a number of clients 112-114, which operate under control of users 102-104. For example, profile service 120 can enable a user to access various fields within the user's profile information or to update the user's profile information.

Note that clients 112-114 can be machines that belong to end users, or alternatively can be machines that host applications that interact with end users. For example, a client can implement a social-networking website that uses profile service 120 to keep track of profiles for users of the social-networking website. In another example, a client can implement a retail website that sells products to consumers, and this retail website can use profile service 120 to keep track of profile information for customers of the retail website.

Profile service 120 stores individual profiles in a profile store 140, wherein each profile includes fields related to a specific person or entity. For example, a profile can be a personal profile that includes personal information, such as a name, a date of birth, and an address, for a user of an application. Alternatively, the profile can be an organizational profile that stores information for a specific organization. For example, if the organization is a company, the profile can store the state of incorporation for the company and can identify the officers of the company. Profiles can also be stored for other types of entities that are not people or organizations. For example, profiles can also be stored for entities, such as vehicles, buildings or cities.

Also note that the fields in a profile can be stored in many possible formats. For example, the fields can be stored in an expandable format comprising a set of key-value pairs. The fields can also be stored in a predefined field structure within a conventional database record, or in fields defined in a row of a relational database table.

During operation, clients 112-114 make requests to profile service 120, which in turn performs various operations that involve storing and retrieving information from profile store 140. As this is happening, profile service 120 stores updates to profiles in an internal profile message queue 125, wherein updates stored in internal profile message queue 125 are ultimately applied to corresponding profiles within profile store 140. The updates in internal profile message queue 125 are also transferred to a live update queue 150 through a process which is described in more detail below.

Note that updates stored within live update queue 150 are not necessarily stored in chronological order. However, updates directed to the same profile are stored chronologically. This ensures that when updates to the same profile obtained by sequentially accessing live update queue 150 are sequentially applied to the profile, updates that occurred later chronologically will be applied after updates that occurred earlier.

Note that storing updates in live update queue 150 facilitates sharing the updates. For example, when a user updates the user's profile, for example by changing an email address, the update is shared through live update queue 150 with various downstream consumers.

To facilitate making a copy of profile store 140, a profile snapshot queue demon 160 periodically records snapshots of profiles in profile store 140 into a profile snapshot queue 170. For example, the snapshot queue demon 160 can be triggered on a daily or weekly basis and can record a snapshot of every profile in profile store 140 into profile snapshot queue 170. Note that this process of recording the snapshots in profile snapshot queue 170 can be performed by a low-priority background process that does not interfere with other higher-priority processes in the underlying computer system. Moreover, this background process can increase its execution speed during lightly loaded periods for an underlying computer system, and can throttle its execution speed during heavily loaded periods for the underlying computer system.

Finally, as mentioned above, to create a copy 180 of profile store 140, a consumer first copies snapshots of all of the profiles in profile snapshot queue 170 into copy of profile store 180. Then, the consumer retrieves updates from live update queue 150 and applies the retrieved updates to profiles in copy of profile store 180. Note that the consumer retrieves the updates starting with (or before) a first update that occurred after the snapshot queue demon 160 started recording the snapshots during its last cycle through all of the profiles in profile store 140. Next, the consumer keeps retrieving and applying these updates until a most-recent update has been processed, at which time the copying process is complete. Note that the consumer can proceed at its own pace during this process. Moreover, it is possible for more than one consumer to make a copy of the profile store at the same time.

Selective Encryption

Figure 2:
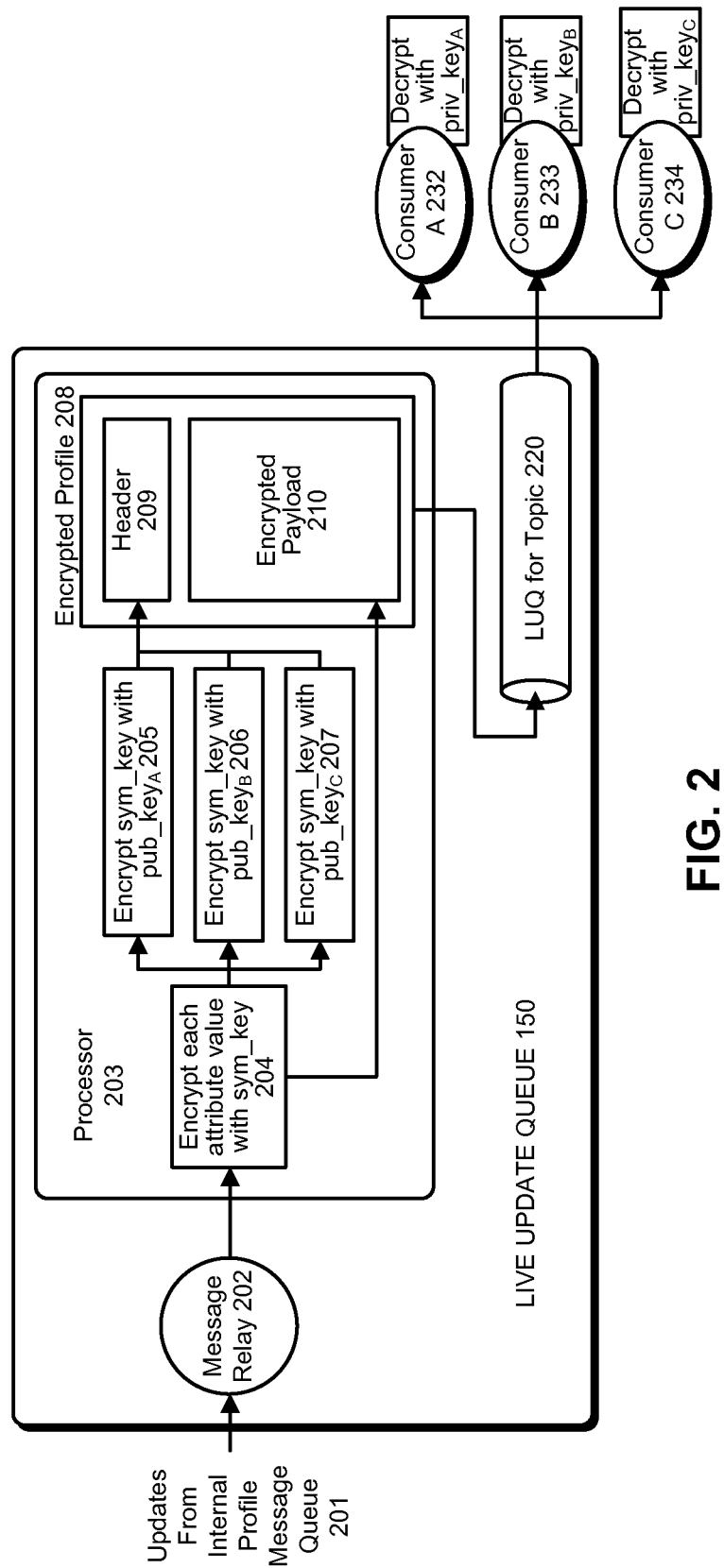
FIG. 2 illustrates the structure of a live update queue in accordance with disclosed embodiments.

In order to provide security, profiles can be selectively encrypted to allow specific individuals to decrypt a specific subset of fields in each profile. In some embodiments, this selective encryption is performed by mechanisms within live update queue 150 as is illustrated in FIG. 2. Referring to FIG. 2, during system operation, a message relay 202 within live update queue 150 receives a stream of updates 201 from internal profile message queue 125. Message relay 202 channels the stream of updates 201 to a processor 203, which encrypts the updates.

Note that a given update in the stream of updates can comprise an update to a single field within a profile (in which case only the single field needs to be encrypted), or the given update can comprise an entire new profile (in which case the entire new profile needs to be encrypted). Note that FIG. 2 illustrates the case of encrypting an entire profile.

During the encryption process, processor 203 first encrypts the attribute value in each field in the profile with a different symmetric key (step 204), and then stores the encrypted attribute values in an encrypted payload 210 for the encrypted profile 208. Next, each symmetric key is encrypted with the public key for each consumer who is authorized to access the field that was encrypted with the symmetric key. For example, as illustrated in steps 205-207 in FIG. 2, the symmetric key (sym_key) that was used to encrypt a specific field in the profile is encrypted with: (1) a public key for consumer A 232 (pub_key$_A$), (2) a public key for consumer B 233 (pub_key$_B$), and (3) a public key for consumer C 234 (pub_key$_C$). These encrypted symmetric keys are then stored in a header 209 for encrypted profile 208.

Encrypted profile 208 is then stored in a live update queue (LUQ) for topic 220. This enables various consumers who have subscribed to LUQ for topic 220 to retrieve and decrypt encrypted profile 208 from the LUQ for topic 220. In particular, consumer A 232 can use her private key (priv_key$_A$) to decrypt the symmetric keys that have been encrypted with pub_key$_A$, and can then use the decrypted symmetric keys to decrypt the encrypted fields that consumer A 232 is authorized to access. Similarly, consumer B 233 can use her private key (priv_key$_B$) to decrypt the symmetric keys that have been encrypted with pub_key$_B$, and can then use the decrypted symmetric keys to decrypt the encrypted fields that consumer B 233 is authorized to access. Finally, consumer C 234 can use her private key (priv_key$_C$) to decrypt the symmetric keys that have been encrypted with pub_key$_C$, and can then use the decrypted symmetric keys to decrypt the encrypted fields that consumer C 234 is authorized to access. In this way, each consumer can only decrypt the fields the consumer is authorized to access and cannot decrypt other fields that the consumer is not authorized to access.

Figure 3:
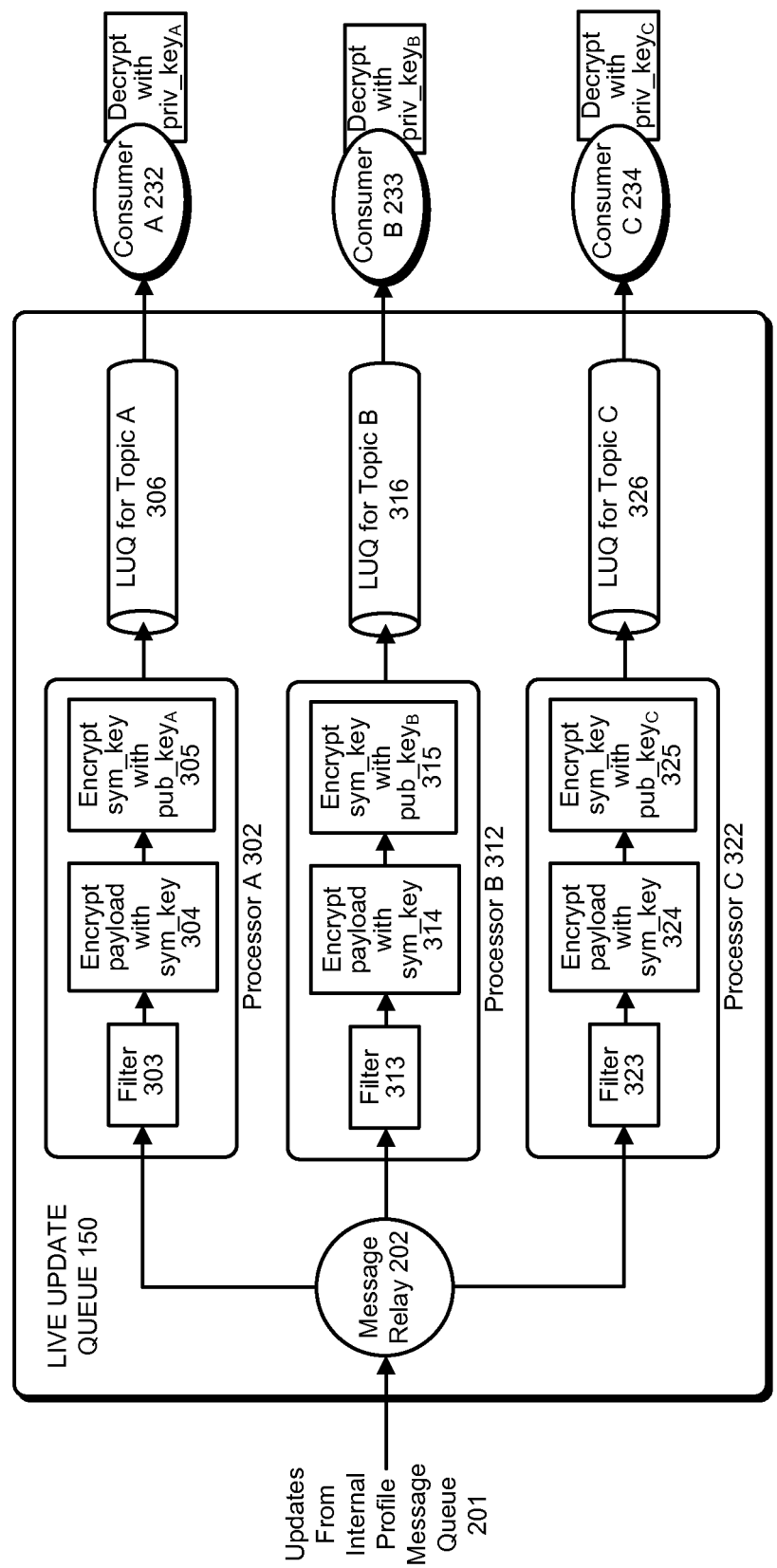
FIG. 3 illustrates an alternative structure for a live update queue in accordance with disclosed embodiments.

FIG. 3 illustrates an alternative structure for live update queue 150 in accordance with disclosed embodiments. In this alternative structure, instead of maintaining a single LUQ for topic 220 that is accessible by multiple consumers, the system maintains multiple LUQs for topics 306, 316 and 326, where a given LUQ for a topic can only be accessed by a single consumer. To prevent an excessive multiplication of the data within these queues, the system performs a filtering operation for each consumer to filter out all of the fields except for the fields the consumer is authorized to access, and then encrypts and stores the authorized fields in a corresponding LUQ for the consumer.

For example, suppose: consumer A 232 is authorized to access a name field and an email address field from each profile; consumer B 233 is authorized to access a name field, a telephone number field and a Social Security number field from each profile; and consumer C 234 is authorized to access a name field and an age field for each profile. In this case, the system would filter out all of the fields, except for the name and email address fields, for each profile before encrypting the remaining fields using the public key for consumer A 232 (pub_key$_A$) and placing the encrypted fields in LUQ for topic A 306. The system would also filter out all of the fields, except for the name, telephone number and Social Security number fields, for each profile before encrypting the remaining fields using the public key for consumer B 233 (pub_key$_B$), and placing the encrypted fields in LUQ for topic B 316. The system would similarly filter out all of the fields, except for the name and age fields, for each profile before encrypting the remaining fields using the public key for consumer C 234 (pub_key$_C$) and placing the encrypted fields in LUQ for topic C 326.

More specifically, in the embodiment illustrated in FIG. 3, message relay 202 channels updates 201 from internal profile message queue 125 to several different processors, including processor A 302, processor B 312 and processor C 322, wherein each processor performs operations to encrypt profile information for a specific topic. For example, during operation, processor A 302 first performs a filtering operation (step 303) to filter out all of the fields that consumer A 232 is not authorized to access. Processor A 302 then encrypts the remaining fields in the payload using randomly generated symmetric keys (step 304), and then encrypts the symmetric keys with the public key for consumer A 232 pub_key$_A$ (step 305). These encrypted symmetric keys are then stored in the header for the encrypted profile as was described above with respect to FIG. 2. Finally, the encrypted profile is stored in LUQ for topic A 306. This enables consumer A 232 to use her private key (priv_key$_A$) to decrypt the symmetric keys that have been encrypted with pub_key$_A$, and to use the decrypted symmetric keys to decrypt the corresponding encrypted fields that consumer A 232 is authorized to access.

Similarly, processor B 312 first performs a filtering operation (step 313) to filter out all of the fields that consumer B 233 is not authorized to access. Processor B 312 then encrypts the remaining fields in the payload using randomly generated symmetric keys (step 314), and then encrypts the symmetric keys with the public key for consumer B 233 pub_key$_B$ (step 315). The encrypted profile is then stored in LUQ for topic B 316. This enables consumer B 233 to use her private key (priv_key$_B$) to decrypt the symmetric keys that have been encrypted with pub_key$_B$, and to use the decrypted symmetric keys to decrypt the corresponding encrypted fields that consumer B 233 is authorized to access.

Similarly, processor C 322 first performs a filtering operation (step 323) to filter out all of the fields that consumer C 234 is not authorized to access. Processor C 322 then encrypts the remaining fields in the payload using randomly generated symmetric keys (step 324), and then encrypts the symmetric keys with the public key for consumer B 234 pub_key$_C$ (step 325). The encrypted profile is then stored in LUQ topic C 326. This enables consumer C 234 to use her private key (priv_key$_C$) to decrypt the symmetric keys that have been encrypted with pub_key$_C$, and to use the decrypted symmetric keys to decrypt the corresponding encrypted fields that consumer C 234 is authorized to access.

Profile Header Structure

Figure 4A:
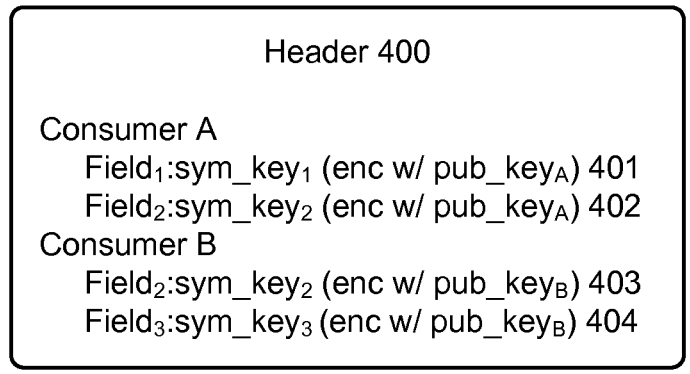
FIG. 4A illustrates the structure of a profile header in accordance with disclosed embodiments.

FIG. 4A illustrates the structure of a profile header 400 that stores symmetric keys in accordance with disclosed embodiments. As illustrated in FIG. 4A, profile header 400 includes a header for each consumer, namely Consumer A and Consumer B. The header for each consumer comprises a map containing "key-value" entries. Within each entry, the "key" is an identifier for a field in the corresponding profile, and the "value" is a randomly generated symmetric key that was used to encrypt the contents of the field. Note that this randomly generated symmetric key is encrypted with the public key for the associated consumer.

More specifically, the header for Consumer A includes two entries 401 and 402. The first entry 401 includes a "key" comprising an identifier for Field$_1$, and a "value" comprising a randomly generated symmetric key sym_key$_1$ that was used to encrypt Field$_1$, wherein sym_key$_1$ is encrypted with pub_key$_A$ (the public key for consumer A). The second entry 402 includes a "key" comprising an identifier for Field$_2$, and a "value" comprising a randomly generated symmetric key sym_key$_2$ that was used to encrypt Field$_2$, wherein sym_key$_2$ is also encrypted with pub_key$_A$. (Note that to further increase security, the identifiers "Field$_1$" and "Field$_2$" can also be encrypted with pub_key$_A$.)

Similarly, the header for consumer B includes two entries 403 and 404. The first entry 403 includes a "key" comprising an identifier for Field$_2$, and a "value" comprising symmetric key sym_key$_2$, wherein sym_key$_2$ is encrypted with pub_key$_B$ (the public key for consumer B). The second entry 404 includes a "key" comprising an identifier for Field$_3$, and a "value" comprising a randomly generated symmetric key sym_key$_3$ that was used to encrypt Field$_3$, wherein sym_key$_3$ is also encrypted with pub_key$_B$.

Header 400 is generally accessed as follows. When consumer A accesses header 400, consumer A first performs a lookup to identify the portion of profile header 400 that serves as a consumer-specific header for consumer A. Next, within this consumer-specific header, Consumer A looks up the two entries 401 and 402 for fields that consumer A is authorized to access, namely Field$_1$ and Field$_2$. Consumer A then uses priv_key$_A$ to decrypt sym_key$_1$, and then uses sym_key$_1$ to decrypt the value contained in Field$_1$. Consumer A also uses priv_key$_A$ to decrypt sym_key$_2$, and then uses sym_key$_2$ to decrypt the value contained in Field$_2$.

Alternative Profile Header Structure

As headers increase in size, it may become cumbersome to encrypt and decrypt all of the entries in the headers using public and private keys. This problem can be alleviated by using an alternative header structure 410 that is illustrated in FIG. 4B, wherein header structure 410 includes a header key part 412 and a payload key part 420.

Header key part 412 includes a key-value entry for each consumer, wherein for each entry the key comprises an identifier for the consumer, and the value comprises a randomly generated symmetric key for the consumer, which is encrypted with the public key of the consumer. More specifically, as illustrated in FIG. 4B, key part 412 includes an entry for Consumer A 413 having a key comprising an identifier for Consumer A and a value comprising a randomly generated symmetric key sym_key$_X$, which has been encrypted with pub_key$_A$. Key part 412 also includes an entry for Consumer B 414 having a key comprising an identifier for Consumer B and a value comprising a randomly generated symmetric key sym_key$_Y$, which has been encrypted with pub_key$_B$.

Payload key part 420 comprises a map for each consumer with "key-value" entries, wherein for a given entry, the "key" is a field identifier, and the "value" is a randomly generated symmetric key that was used to encrypt the contents of the field. Note that this randomly generated symmetric key is encrypted with the above-described randomly generated symmetric key for the consumer.

Figure 4B:
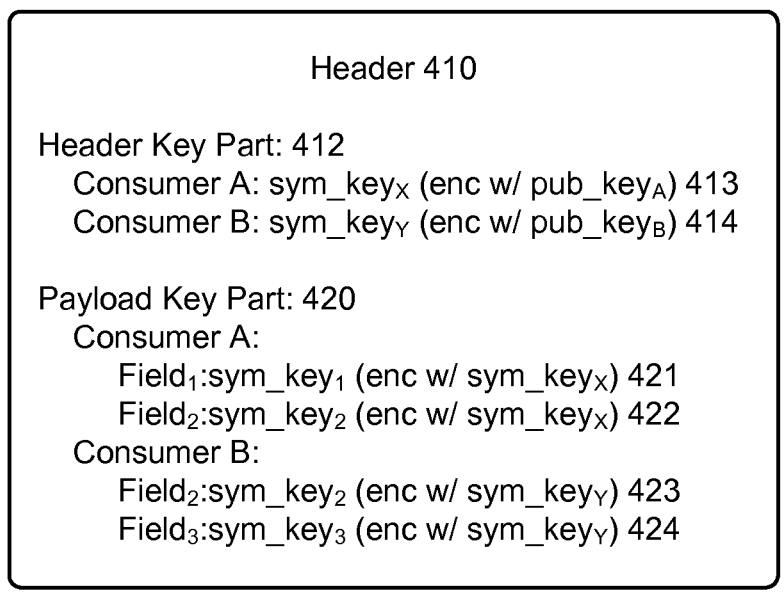
FIG. 4B illustrates an alternative structure for a profile header in accordance with disclosed embodiments.

More specifically, referring to FIG. 4B, the map for Consumer A includes two entries 421 and 422. The first entry 421 has a "key" comprising an identifier for Field$_1$, and a "value" comprising a randomly generated symmetric key sym_key$_1$ that was used to encrypt Field$_1$, wherein sym_key$_1$ is encrypted with sym_key$_X$. The second entry 422 includes a "key" comprising an identifier for Field$_2$, and a "value" comprising a randomly generated symmetric key sym_key$_2$ that was used to encrypt Field$_2$, wherein sym_key$_2$ is also encrypted with sym_key$_X$. (Note that to further increase security, the identifiers "Field$_1$" and "Field$_2$" can also be encrypted with sym_key$_X$.)

Similarly, the map for Consumer B includes two entries 423 and 424. The first entry 423 has a "key" comprising an identifier for Field$_2$, and a "value" comprising a randomly generated symmetric key sym_key$_2$ that was used to encrypt Field$_2$, wherein sym_key$_2$ is encrypted with sym_key$_Y$. The second entry 424 includes a "key" comprising an identifier for Field$_3$, and a "value" comprising a randomly generated symmetric key sym_key$_3$ that was used to encrypt Field$_3$, wherein sym_key$_3$ is also encrypted with sym_key$_Y$. (Note that to further increase security, the identifiers "Field$_2$" and "Field$_3$" can also be encrypted with sym_key$_Y$.)

Header 410 is generally accessed as follows. When Consumer A accesses header 410, Consumer A first looks up a corresponding entry for consumer A 413 in header key part 412. Consumer A then uses priv_key$_A$ to decrypt sym_key$_X$, which is contained in entry 413. Next, Consumer A performs a lookup (or scanning operation) to identify the portion of payload key part 420 that serves as a consumer-specific header for consumer A. Next, within this consumer-specific header, Consumer A looks up the two entries 421 and 422 for fields that consumer A is authorized to access, namely Field$_1$ and Field$_2$. Next, Consumer A uses sym_key$_X$ to decrypt sym_key$_1$, and then uses sym_key$_1$ to decrypt the value contained in Field$_1$. Consumer A also uses sym_key$_X$ to decrypt sym_key$_2$, and then uses sym_key$_2$ to decrypt the value contained in Field$_2$.

Process of Copying a Profile Store

Figure 5:
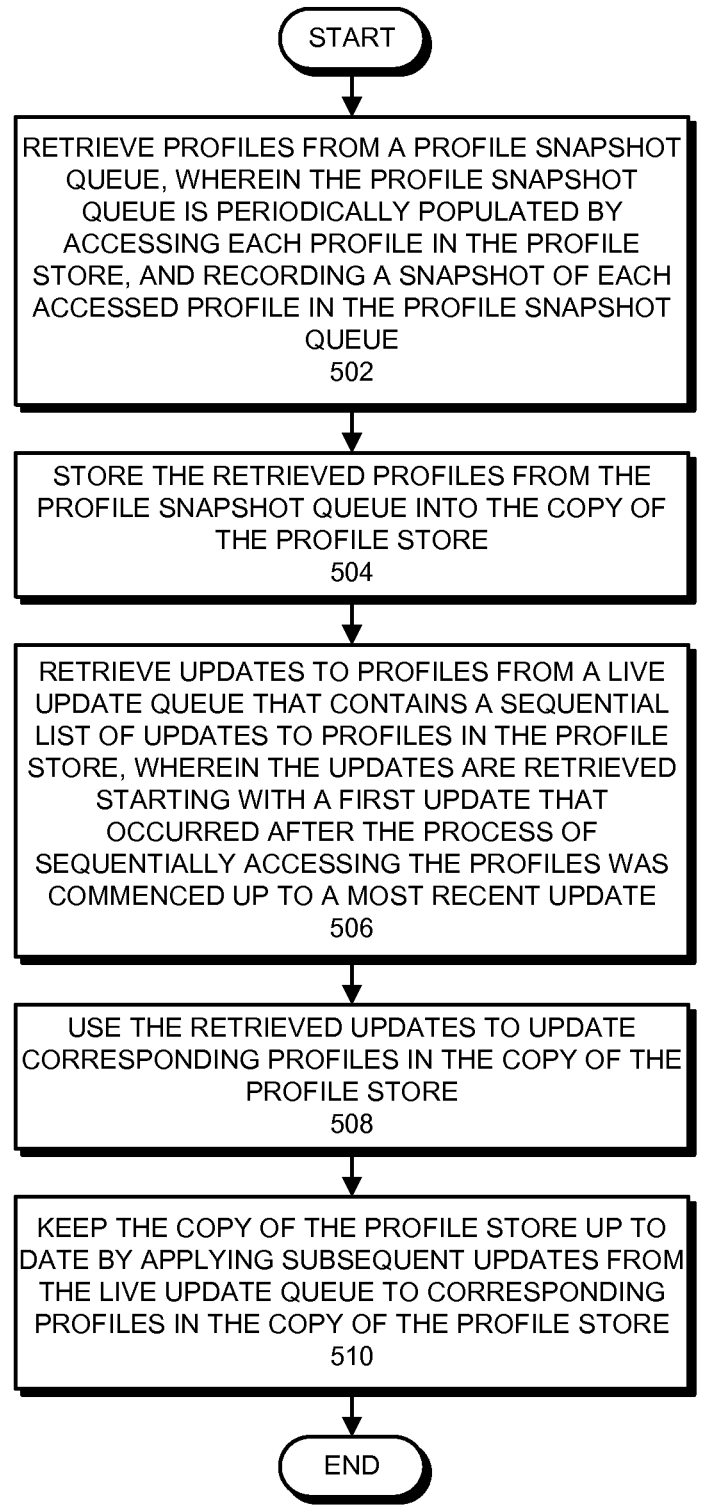
FIG. 5 presents a flow chart illustrating how a profile store is copied in accordance with the disclosed embodiments.

FIG. 5 presents a flow chart illustrating the process of copying a profile store in accordance with the disclosed embodiments. During operation, the system retrieves profiles from a profile snapshot queue, wherein the profile snapshot queue is periodically populated by accessing each profile in the profile store, and recording a snapshot of each accessed profile in the profile snapshot queue (step 502). Next, the system stores the retrieved profiles from the profile snapshot queue into the copy of the profile store (step 504). After this is complete, the system retrieves updates to profiles from a live update queue that contains a sequential list of updates to profiles in the profile store, wherein the updates are retrieved starting with a first update that occurred after the process of sequentially accessing the profiles was commenced up to a most recent update (step 506). Then, the system uses the retrieved updates to update corresponding profiles in the copy of the profile store (step 508). Finally, after the most recent update has been applied to the copy of the profile store, the system keeps the copy of the profile store up to date by applying subsequent updates from the live update queue to corresponding profiles in the copy of the profile store (step 510).

Figure 6:
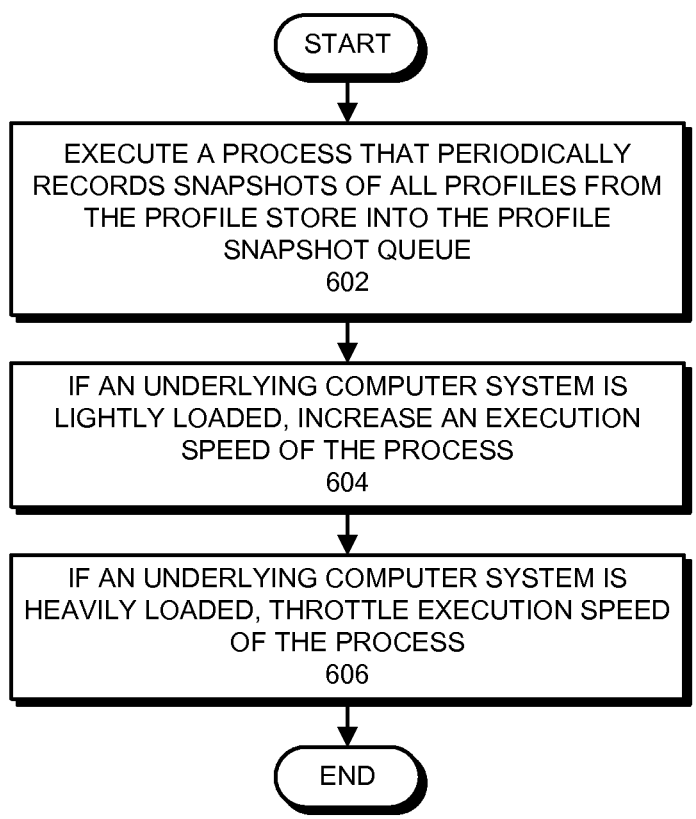
FIG. 6 presents a flow chart illustrating how the profile snapshot queue is updated in accordance with the disclosed embodiments.

FIG. 6 presents a flow chart illustrating how the profile snapshot queue is updated in accordance with the disclosed embodiments. First, the system executes a process that periodically records snapshots of all profiles in the profile store in the profile snapshot queue (step 602). Next, if an underlying computer system is lightly loaded, the system increases an execution speed of the process (step 604). Alternatively, if an underlying computer system is heavily loaded, the system throttles execution of the process (step 606).

Decrypting a Profile

Figure 7:
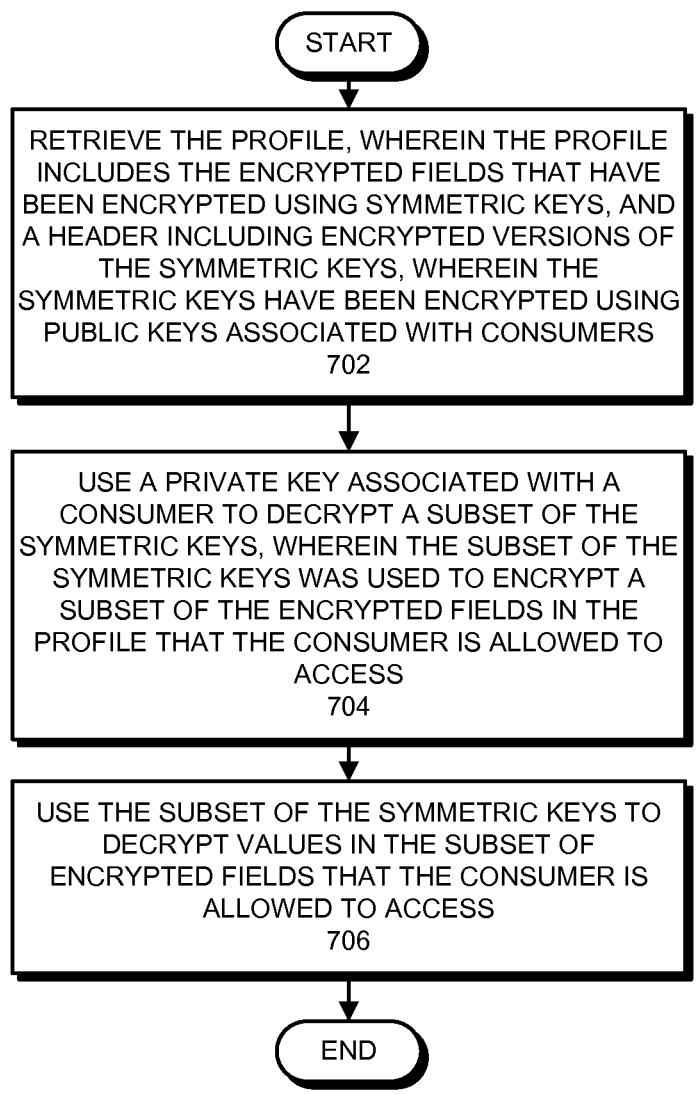
FIG. 7 presents a flow chart illustrating how a profile is decrypted in accordance with the disclosed embodiments.

FIG. 7 presents a flow chart illustrating how a profile is decrypted in accordance with the disclosed embodiments. The system first retrieves the profile, wherein the profile includes the encrypted fields that have been encrypted using symmetric keys, and a header (illustrated in FIG. 4A) including encrypted versions of the symmetric keys, wherein the symmetric keys have been encrypted using public keys associated with consumers (step 702). Next, the system uses a private key associated with a consumer to decrypt a subset of the symmetric keys, wherein the subset of the symmetric keys was used to encrypt a subset of the encrypted fields in the profile that the consumer is allowed to access (step 704). (Note that for the alternative header structure illustrated in FIG. 4B, this step involves: (1) using the private key for the consumer to decrypt the encrypted symmetric key for the consumer; and (2) using the decrypted symmetric key for the consumer to decrypt the subset of symmetric keys for the fields the consumer is allowed to access.)

Finally, the system uses the subset of the symmetric keys to decrypt values in the subset of encrypted fields that the consumer is allowed to access (step 706).

Figure 8:
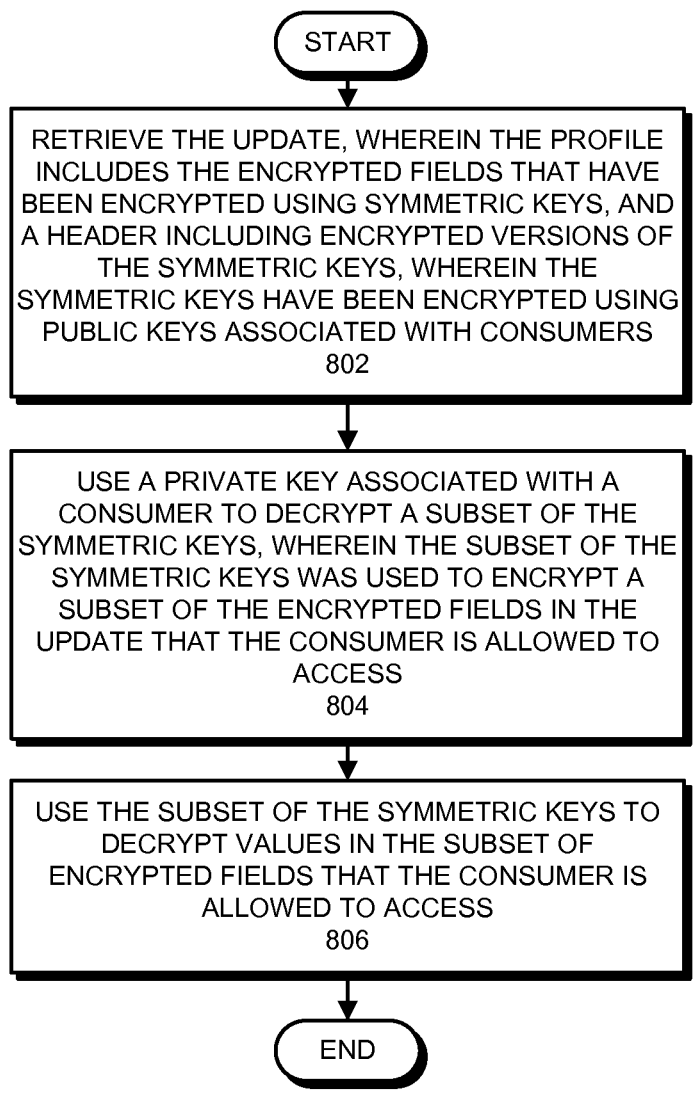
FIG. 8 presents a flow chart illustrating how a profile update is decrypted in accordance with the disclosed embodiments.

FIG. 8 presents a flow chart illustrating how an update is decrypted in accordance with the disclosed embodiments. First, the system retrieves the update, wherein the update includes the encrypted fields that have been encrypted using symmetric keys, and a header including encrypted versions of the symmetric keys, wherein the symmetric keys have been encrypted using public keys associated with consumers (step 802). Next, the system uses a private key associated with a consumer to decrypt a subset of the symmetric keys, wherein the subset of the symmetric keys was used to encrypt a subset of the encrypted fields in the update that the consumer is allowed to access (step 804). Finally, the system uses the subset of the symmetric keys to decrypt values in the subset of the encrypted fields that the consumer is allowed to access (step 806).

Encrypting a Profile

Figure 9:
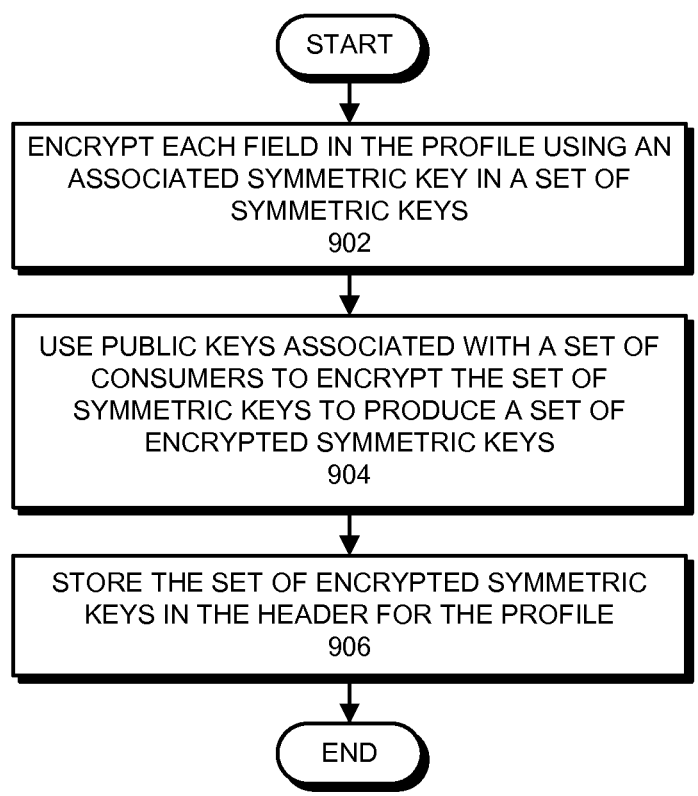
FIG. 9 presents a flow chart illustrating how a profile is encrypted in accordance with the disclosed embodiments.

FIG. 9 presents a flow chart illustrating how a profile with the header structure illustrated in FIG. 4A is encrypted in accordance with the disclosed embodiments. First, the system encrypts each field in the profile using an associated symmetric key in a set of symmetric keys (step 902). Next, the system uses public keys associated with a set of consumers to encrypt the set of symmetric keys to produce a set of encrypted symmetric keys (step 904). (Note that for the alternative header structure illustrated in FIG. 4B, this step involves: (1) generating a symmetric key for the consumer; (2) using the symmetric key for the consumer to encrypt symmetric keys for fields the consumer is allowed to access; and (3) using a public key for the consumer to encrypt the symmetric key for the consumer.) Finally, the system stores the set of encrypted symmetric keys in the header for the profile (step 906).

Revoking Access to an Encrypted Profile

Note that it is possible to revoke access by a consumer to one or more fields in a profile. This can be accomplished by updating the header of the profile to remove encrypted versions of symmetric keys that can be decrypted using a private key associated with the consumer. In some embodiments of the present invention, the header is updated by constructing a new version of the profile that includes a header in which none of the symmetric keys are encrypted with the public key of the consumer. Then, the system swaps the new version of the profile in for the old version of the profile. For example, if a profile is accessed from a data store (e.g., the profile snapshot queue 170) based on a specific key value, then a lookup mechanism within the data store can be updated to access the new version of the profile instead of the old version based on the specific key value. In this case, the storage occupied by the old version of the profile can eventually be reclaimed through a garbage-collection process.

Computer System

Figure 10:
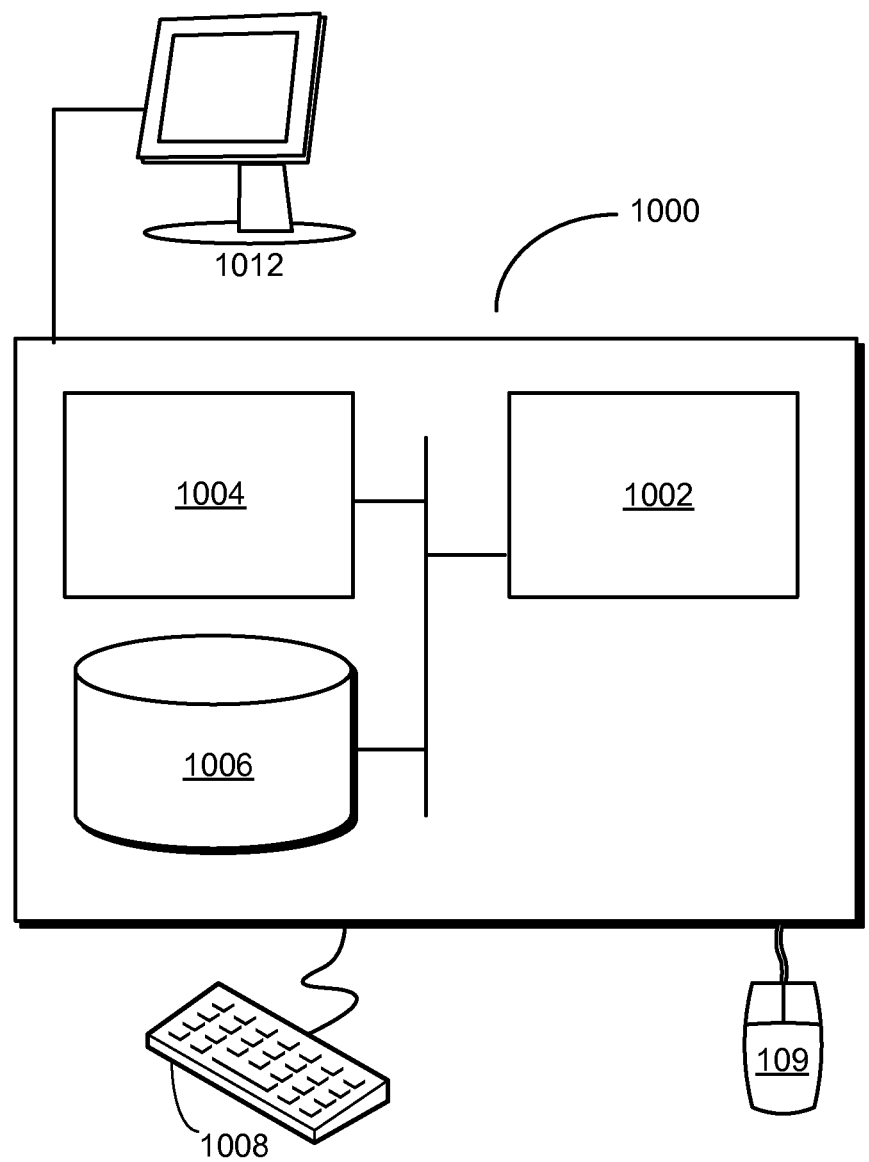
FIG. 10 illustrates a computer system in accordance with the disclosed embodiments.

FIG. 10 illustrates the structure of an exemplary computer system 1000 in accordance with the disclosed embodiments. For example, exemplary computer system 1000 can be a client computer system, such as client computer systems 112-114 illustrated in FIG. 1. Exemplary computer system 1000 can also be a computer system upon which profile service 120, live update queue 150 and profile snapshot queue 170 illustrated in FIG. 1 are maintained.

Referring to FIG. 10, computer system 1000 includes a processor 1002, memory 1004, storage 1006, and/or other components found in electronic computing devices such as personal computers, laptop computers, workstations, servers, mobile phones, tablet computers, and/or portable media players. Processor 1002 may support parallel processing and/or multi-threaded operation with other processors in computer system 1000. Computer system 1000 may also include input/output (I/O) devices such as a keyboard 1008, a mouse 109, and a display 1012.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for encrypting fields in a profile, comprising:
    adding a profile associated with a user to a profile snapshot queue, wherein the profile includes encrypted fields that have been encrypted using symmetric keys, and a header including access information, wherein the access information comprises multiple versions of single symmetric keys encrypted by public keys associated with a plurality of consumers and wherein each of the plurality of consumers has different permissions to access the encrypted fields;
    receiving a request by a consumer of the plurality of consumers to access the profile;
    transmitting the profile from the profile snapshot queue to the consumer;
    receiving an update to the profile from the user, wherein the update comprises updated fields corresponding to the encrypted fields and an update header;
    adding the update to a live update queue, wherein the live update queue is accessible by the plurality of consumers;
    encrypting the updated fields with symmetric keys;
    encrypting the symmetric keys with a public key of the consumer;
    storing the encrypted symmetric keys in the update header; and
    enabling the consumer to access the update from the live update queue.

2. The method of claim 1, wherein adding the update to the live update queue comprises:
    retrieving the update, wherein the update includes the encrypted fields that have been encrypted using symmetric keys, and a header including encrypted versions of the symmetric keys, wherein the symmetric keys have been encrypted using public keys associated with consumers;
    using a private key associated with a consumer to decrypt a subset of the symmetric keys, wherein the subset of the symmetric keys was used to encrypt a subset of the encrypted fields in the update that the consumer is allowed to access; and
    using the subset of the symmetric keys to decrypt values in the subset of the encrypted fields that the consumer is allowed to access.

3. The method of claim 1, wherein each encrypted field in the profile is encrypted with a different symmetric key.

4. The method of claim 1, wherein the header is organized to facilitate looking up encrypted versions of symmetric keys belonging to a given consumer.

5. The method of claim 1,
    wherein encrypting the updated fields with symmetric keys comprises:
        generating a symmetric key for the consumer,
        using the symmetric key for the consumer to encrypt symmetric keys for fields the consumer is allowed to access,
        using a public key for the consumer to encrypt the symmetric key for the consumer, and
        storing the encrypted symmetric keys for the fields the consumer is allowed to access and the encrypted symmetric key for the consumer in the header; and
    decrypting the subset of symmetric keys for the fields the consumer is allowed to access, including:
        using the private key for the consumer to decrypt the encrypted symmetric key for the consumer; and
        using the decrypted symmetric key for the consumer to decrypt the subset of symmetric keys for the fields the consumer is allowed to access.

6. The method of claim 1, wherein the profiles in the profile snapshot queue include:
    personal profiles containing personal attributes associated with corresponding people; and
    organizational profiles containing organizational attributes associated with corresponding organizations.

7. The method of claim 1, wherein the method further comprises revoking access by the consumer to one or more fields in the profile by updating the header of the profile to remove encrypted versions of symmetric keys that can be decrypted using a private key associated with the consumer.

8. The method of claim 1, wherein the profile snapshot queue is periodically populated by accessing each profile in the profile store while the profile store is being updated, and recording a snapshot of each accessed profile in the profile snapshot queue.

9. The method of claim 8, wherein the profile snapshot queue is accessible by multiple consumers, and each of the multiple consumers can read through the profile snapshot queue at a different speed.

10. A non-transitory computer-readable storage medium storing instructions that when executed by a computer cause the computer to perform a method for encrypting fields in a profile, comprising:
    adding a profile associated with a user to a profile snapshot queue, wherein the profile includes encrypted fields that have been encrypted using symmetric keys, and a header including access information, wherein the access information comprises multiple versions of single symmetric keys encrypted by public keys associated with a plurality of consumers and wherein each of the plurality of consumers has different permissions to access the encrypted fields;
    receiving a request by a consumer of the plurality of consumers to access the profile;
    transmitting the profile from the profile snapshot queue to the consumer;
    receiving an update to the profile from the user, wherein the update comprises updated fields corresponding to the encrypted fields and an update header;
    adding the update to a live update queue, wherein the live update queue is accessible by the plurality of consumers;
    encrypting the updated fields with symmetric keys;
    encrypting the symmetric keys with a public key of the consumer;
    storing the encrypted symmetric keys in the update header; and enabling the consumer to access the update from the live update queue.

11. The non-transitory computer-readable storage medium of claim 10, wherein adding the update to the live update queue comprises:
retrieving the update, wherein the update includes the encrypted fields that have been encrypted using symmetric keys, and a header including encrypted versions of the symmetric keys, wherein the symmetric keys have been encrypted using public keys associated with consumers;
using a private key associated with a consumer to decrypt a subset of the symmetric keys, wherein the subset of the symmetric keys was used to encrypt a subset of the encrypted fields in the update that the consumer is allowed to access; and
using the subset of the symmetric keys to decrypt values in the subset of the encrypted fields that the consumer is allowed to access.

12. The non-transitory computer-readable storage medium of claim 10, wherein each encrypted field in the profile is encrypted with a different symmetric key.

13. The non-transitory computer-readable storage medium of claim 10, wherein the header is organized to facilitate looking up encrypted versions of symmetric keys belonging to a given consumer.

14. The non-transitory computer-readable storage medium of claim 10, wherein encrypting the updated fields with symmetric keys comprises:
generating a symmetric key for the consumer,
using the symmetric key for the consumer to encrypt symmetric keys for fields the consumer is allowed to access,
using a public key for the consumer to encrypt the symmetric key for the consumer, and
storing the encrypted symmetric keys for the fields the consumer is allowed to access and the encrypted symmetric key for the consumer in the header; and
decrypting the subset of symmetric keys for the fields the consumer is allowed to access, including:
using the private key for the consumer to decrypt the encrypted symmetric key for the consumer; and
using the decrypted symmetric key for the consumer to decrypt the subset of symmetric keys for the fields the consumer is allowed to access.

15. The non-transitory computer-readable storage medium of claim 10, wherein the profiles in the profile snapshot queue include:
personal profiles containing personal attributes associated with corresponding people; and
organizational profiles containing organizational attributes associated with corresponding organizations.

16. The non-transitory computer-readable storage medium of claim 10, wherein the method further comprises revoking access by the consumer to one or more fields in the profile by updating the header of the profile to remove encrypted versions of symmetric keys that can be decrypted using a private key associated with the consumer.

17. The non-transitory computer-readable storage medium of claim 10, wherein the profile snapshot queue is periodically populated by accessing each profile in the profile store while the profile store is being updated, and recording a snapshot of each accessed profile in the profile snapshot queue.

18. The non-transitory computer-readable storage medium of claim 17, wherein the profile snapshot queue is accessible by multiple consumers, and each of the multiple consumers can read through the profile snapshot queue at a different speed.

19. A system that facilitates accessing encrypted fields in a profile, comprising:
at least one processor and at least one associated memory; and
a decryption mechanism that executes on the at least one processor, wherein the decryption mechanism is configured to perform a method for encrypting fields in a profile, comprising:
adding a profile associated with a user to a profile snapshot queue, wherein the profile includes encrypted fields that have been encrypted using symmetric keys, and a header including access information, wherein the access information comprises multiple versions of single symmetric keys encrypted by public keys associated with a plurality of consumers and wherein each of the plurality of consumers has different permissions to access the encrypted fields;
receiving a request by a consumer of the plurality of consumers to access the profile;
transmitting the profile from the profile snapshot queue to the consumer;
receiving an update to the profile from the user, wherein the update comprises updated fields corresponding to the encrypted fields and an update header;
adding the update to a live update queue, wherein the live update queue is accessible by the plurality of consumers;
encrypting the updated fields with symmetric keys;
encrypting the symmetric keys with a public key of the consumer;
storing the encrypted symmetric keys in the update header; and
enabling the consumer to access the update from the live update queue.

20. The system of claim 19, wherein adding the update to the live update queue comprises:
retrieving the update, wherein the update includes the encrypted fields that have been encrypted using symmetric keys, and a header including encrypted versions of the symmetric keys, wherein the symmetric keys have been encrypted using public keys associated with consumers;
using a private key associated with a consumer to decrypt a subset of the symmetric keys, wherein the subset of the symmetric keys was used to encrypt a subset of the encrypted fields in the update that the consumer is allowed to access; and
using the subset of the symmetric keys to decrypt values in the subset of the encrypted fields that the consumer is allowed to access.

21. The system of claim 19, wherein each encrypted field in the profile is encrypted with a different symmetric key.

22. The system of claim 19, wherein the header is organized to facilitate looking up encrypted versions of symmetric keys belonging to a given consumer.

23. The system of claim 19,
wherein encrypting the updated fields with symmetric keys comprises:
generating a symmetric key for the consumer,
using the symmetric key for the consumer to encrypt symmetric keys for fields the consumer is allowed to access,
using a public key for the consumer to encrypt the symmetric key for the consumer, and storing the encrypted symmetric keys for the fields the consumer is allowed to access and the encrypted symmetric key for the consumer in the header; and decrypting the subset of symmetric keys for the fields the consumer is allowed to access including, using the private key for the consumer to decrypt the encrypted symmetric key for the consumer, and using the decrypted symmetric key for the consumer to decrypt the subset of symmetric keys for the fields the consumer is allowed to access.

24. The system of claim 19, wherein the profiles in the profile snapshot queue include:

personal profiles containing personal attributes associated with corresponding people; and organizational profiles containing organizational attributes associated with corresponding organizations.

25. The system of claim 19, further comprising a revocation mechanism that revokes access by the consumer to one or more fields in the profile by updating the header of the profile to remove encrypted versions of symmetric keys that can be decrypted using a private key associated with the consumer.

26. The system of claim 19, wherein the profile snapshot queue is periodically populated by accessing each profile in the profile store while the profile store is being updated, and recording a snapshot of each accessed profile in the profile snapshot queue.

27. The system of claim 26, wherein the profile snapshot queue is accessible by multiple consumers, and each of the multiple consumers can read through the profile snapshot queue at a different speed.

* * * * *